United States Patent
Bahal et al.

(10) Patent No.: US 12,101,241 B1
(45) Date of Patent: Sep. 24, 2024

(54) MECHANISM FOR INTELLIGENT AND COMPREHENSIVE MONITORING SYSTEM USING PEER-TO-PEER AGENTS IN A NETWORK

(71) Applicant: Hewlett Packard Enterprise Development LP, Spring, TX (US)

(72) Inventors: Rahul Bahal, Danville, CA (US); Nicholas R. Von Klemperer, Cape Town (ZA)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/122,582

(22) Filed: Mar. 16, 2023

(51) Int. Cl.
*H04L 41/22* (2022.01)
*H04L 41/046* (2022.01)
*H04L 41/12* (2022.01)
*H04L 43/045* (2022.01)
*H04L 43/50* (2022.01)
*H04L 67/104* (2022.01)

(52) U.S. Cl.
CPC .......... *H04L 43/50* (2013.01); *H04L 41/046* (2013.01); *H04L 41/22* (2013.01); *H04L 41/12* (2013.01); *H04L 43/045* (2013.01); *H04L 67/104* (2013.01)

(58) Field of Classification Search
CPC ..... H04L 43/045; H04L 43/50; H04L 41/046; H04L 41/12; H04L 41/22; H04L 67/104
See application file for complete search history.

(56) References Cited

U.S. PATENT DOCUMENTS

| 5,872,931 A | * | 2/1999 | Chivaluri | H04L 41/046 |
| | | | | 709/224 |
| 2003/0225876 A1 | * | 12/2003 | Oliver | H04L 43/091 |
| | | | | 709/224 |

(Continued)

OTHER PUBLICATIONS

Yang, Sheng-Yuan, and Yi-Yen Chang. "An active and intelligent network management system with ontology-based and multi-agent techniques." Expert Systems with Applications 38.8: 10320-10342. (Year: 2011).*

(Continued)

*Primary Examiner* — John M MacIlwinen
(74) *Attorney, Agent, or Firm* — Yao Legal Services, Inc.

(57) ABSTRACT

A system and method are provided which facilitate peer-to-peer collaborative network monitoring. The system deploys a network-monitoring agent on a device and discovers peer devices on a same local network absent of receiving a cloud-orchestrated instruction. Responsive to successful direct communication with a server, the device obtains a configuration file, which indicates network metrics to be monitored and a condition associated with a network metric. Responsive to unsuccessful direct communication, the device obtains the configuration file via a peer device. The device monitors the indicated network metrics. If the condition is met, the system performs a predetermined action. Responsive to successful direct communication, the device transmits data associated with the monitored metrics and the action. Responsive to unsuccessful direct communication, the device transmits the data via a peer device, thereby allowing the server to display, in connection with a network topology, aggregated network monitoring data for the network devices.

18 Claims, 7 Drawing Sheets

(56) References Cited

U.S. PATENT DOCUMENTS

| | | | | |
|---|---|---|---|---|
| 2003/0235169 A1* | 12/2003 | Pandey | ............... | H04W 4/00 |
| | | | | 370/310 |
| 2005/0235058 A1* | 10/2005 | Rackus | ............... | H04L 43/00 |
| | | | | 709/224 |
| 2008/0189406 A1* | 8/2008 | Shen | ............... | H04L 41/5012 |
| | | | | 709/224 |
| 2010/0299419 A1* | 11/2010 | Ramankutty | ....... | H04W 28/088 |
| | | | | 709/221 |
| 2021/0194908 A1* | 6/2021 | Wu | ............... | H04L 63/1408 |
| 2023/0283514 A1* | 9/2023 | Jea | ............... | H04L 41/0627 |
| | | | | 709/224 |
| 2023/0308374 A1* | 9/2023 | Wang | ............... | H04L 43/0876 |

OTHER PUBLICATIONS

Liotta, Antonio, Graham Knight, and George Pavlou. "Modelling network and system monitoring over the internet with mobile agents ." NOMS 98 1998 IEEE Network Operations and Management Symposium. Vol. 2. IEEE. (Year: 1998).*

Basu, Sujoy, et al. "Nodewiz: peer-to-peer resource discovery for grids." CCGrid 2005. IEEE International Symposium on Cluster Computing and the Grid, 2005. vol. 1. IEEE. (Year: 2005).*

\* cited by examiner

MECHANISM FOR INTELLIGENT AND COMPREHENSIVE MONITORING SYSTEM USING PEER-TO-PEER AGENTS IN A NETWORK

BACKGROUND

Field

Network monitoring of enterprise systems may be performed using a combination of hardware and software-based solutions. Testing agents in cloud-based configurations can communicate directly with their cloud backend using the same network that the testing agents are to monitor, and the testing agents may subsequently perform the monitoring tasks and report results to the cloud backend. However, some limitations can include involve a lack of visibility by various testing agents, differing functionality of devices with which testing agents be associated, and the use of varying monitoring solutions for different testing agents.

BRIEF DESCRIPTION OF THE FIGURES

In the figures, like reference numerals refer to the same figure elements.

DETAILED DESCRIPTION

Figure 1:
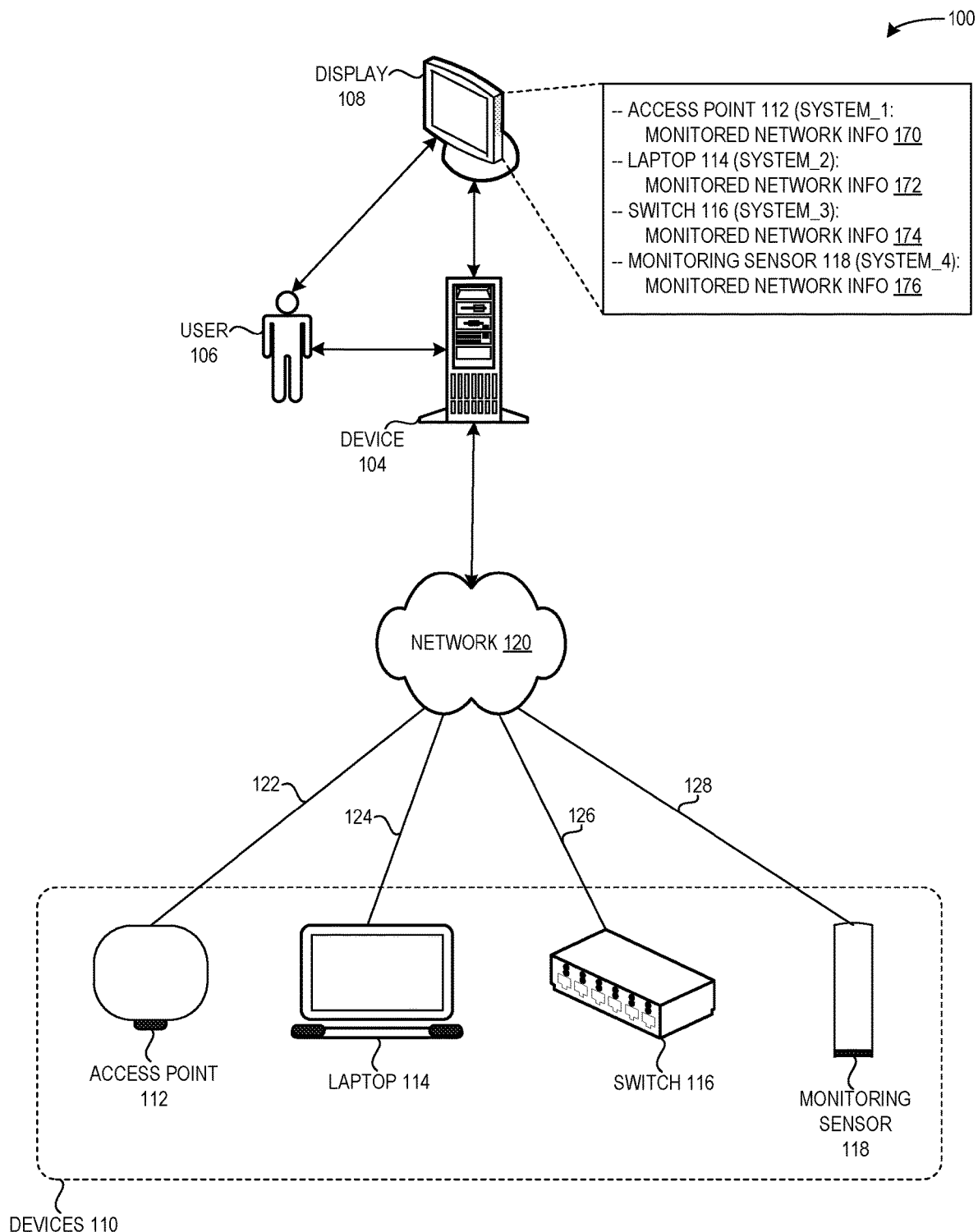
FIG. 1 illustrates an environment using a traditional model of monitoring with distinct endpoints, in accordance with the prior art.

Aspects of the instant application address the limitations of isolated monitoring devices by providing a system which leverages a peer-to-peer integration between distinct types of hardware and software monitoring devices in a network. The described aspects can also perform detection of preconfigured conditions (e.g., monitored network metrics or test results) which can trigger predetermined corresponding actions, thus resulting in a comprehensive and intelligent monitoring system across the network.

Network monitoring of enterprise systems may be performed using a combination of hardware and software-based solutions. The hardware-based solutions can include dedicated hardware platforms which perform constant network monitoring. One example can be a purpose-built device that is placed in a strategic position inside the network to provide network and user-based monitoring to ensure uptime, performance, and Quality-of-Service (QOS) and to guarantee SLAs (Service Level Agreements). The software-based solutions can include client software offerings which measure network metrics, e.g., application-level software offerings which run on user-provided host hardware which also provides monitoring from a given device's perspective for the desired metrics.

In cloud-based configurations, testing agents can generally communicate directly with their cloud backend using the same network that the testing agents are to monitor. The testing agents may subsequently perform the monitoring tasks and report results to the cloud backend. Testing agents may be associated with endpoint devices ("endpoints") and non-endpoint devices (as defined below) and may further be based on hardware, software, or a combination of hardware and software. One example of a hardware-based testing agent can be a User Experience Insight (UXI) sensor, which can be deployed as a hardware sensor that tracks the health and performance of a network. Based on its configuration as received from the cloud or other server, the UXI sensor can keep track of a wireless (or wired) network by monitoring the network continuously and reporting to a UXI backend measurements, results, and any problems that it may encounter or identify in the network. An example of a software-based testing agent can be an equivalent software monitoring agent that runs inside a virtualized container. The software agent can be executed or deployed on a compatible host, such as an access point (AP), a hardware switch, or a client software application that runs on a laptop.

However, some limitations exist in using the current hardware- and software-based solutions, for both endpoint devices and non-endpoint devices. One limitation can be that a single device in the network may lack visibility into other devices or clients in the network, and the single device may perform its monitoring and operation as a leaf node device, essentially in isolation from the other devices on the network. Any issues which the single device may uncover may be unique to that single device (e.g., firewall policies) or may involve a network-wide issue (e.g., an issue related to a Software-Defined Wide Area Network (SD-WAN)/gateway).

Another limitation can be that each device may perform domain-specific tasks. For example, a hardware-based endpoint may monitor the quality of the wireless network, while a software-based endpoint may perform another type of task that is relevant to the host (e.g., a switch or an access point (AP)) on which the software is being run. In existing architectures, collaboration on peer-driven actions and network monitoring may require a central (e.g., cloud-based) orchestration, instead of direct communication between peer devices. If an event or condition of interest (such as a failure condition) related to a particular device occurs, a failure to establish connectivity to a central entity (e.g., the cloud) may result in an inability to address the event or condition of interest. In some instances, the event or condition may occur and be concluded before cloud connectivity has been established, which can result in the correct orchestration never being achieved. In other instances, the failure to establish cloud connectivity may result in the event or condition never being detected or addressed, which can also result in the correct orchestration never being achieved.

Yet another limitation can involve the use of varying monitoring solutions for different devices. In order to handle disparate devices on a network, an end-user must configure distinct monitoring solutions separately. Keeping track of the disparate information (e.g., metrics, results, and status) associated with these varying monitoring solutions may be burdensome and result in a cumbersome and inefficient overall monitoring solution for the network. Furthermore, it may be difficult to stitch together the information received from the distinct type of devices (and correspondingly distinct monitoring solutions) to present the data in a useful or cohesive manner to the user. This disparate information can also result in an increased challenge for the user in performing root cause analysis and fault detection.

Aspects of the instant application address these limitations by providing a system which leverages a peer-to-peer integration between distinct types of hardware and software monitoring devices in the network, which can result in providing a comprehensive and intelligent monitoring system across the network. The described aspects facilitate devices which can communicate and collaborate to provide a collective overview or representation of the network, i.e., by forming a collective ecosystem of elements, including endpoint devices and non-endpoint devices. The described aspects of the system can provide a comprehensive and intelligent monitoring system across, e.g., a customer's network and can further provide user experience insights at different points of the network infrastructure. By using the collaborative features of the described aspects, the system can provide network metrics and other related information at, from, or by any device in the network, including endpoint devices and non-endpoint devices (as described below). In addition, the system can use a set of conditions and corresponding actions to perform intelligent monitoring. These conditions/actions can be user-defined or system-defined. Thus, instead of a single device operating in isolation (as described below in relation to FIG. 1), the described aspects can use peer-to-peer agents, along with the condition/action configurations, to provide an intelligent and comprehensive monitoring system.

The terms "endpoint" and "endpoint device" are used interchangeably in this disclosure and refer to a physical or virtual device which can connect to and exchange information with other devices over or in a network. An endpoint device may be an "edge node" or a "leaf node" in a network topology. Examples of endpoint devices may include, but are not limited to, desktop computers, laptops, mobile devices, tablets, printers, access points, embedded devices, servers, virtual machines, thin clients, sensors, actuators, point of sale terminals, and smart meters.

The term "non-endpoint device" is used in this disclosure to refer to a physical or virtual device which can connect to and exchange information with other devices over or in a network. A non-endpoint device may be an "internal node" or a "branch node" in a network topology. Examples of non-endpoint devices may include, but are not limited to, switches, access switches, gateways, routers, and one or more of the endpoint devices described herein.

The terms "peers" and "peer devices" are used interchangeably in this disclosure and refer to devices between which can exist a direct communication infrastructure or other communication link.

The term "testing agent" is used in this disclosure to refer to a component, module, unit, or program which may be associated with endpoint devices and non-endpoint devices and may further be based on hardware, software, or a combination of hardware and software. A testing agent may perform various functions or operations, including but not limited to testing, monitoring, and communication of information, e.g., metrics, results, and status of network-related and device-related information.

Traditional Model of Monitoring Using Distinct Endpoints Versus Using Peer-to-Peer Agents FIG. 1 illustrates an environment 100 using a traditional model of monitoring with distinct endpoints, in accordance with the prior art. Environment 100 can include: a device 104 associated with a user 106 and a display 108; and devices 110. Device 104 can be a cloud server or can represent a cloud-based service or set of servers. Devices 110 can include a variety of devices, including but not limited to: an endpoint device; a non-endpoint device; an intermediate device; an edge or leaf node; an internal or branch node; an access point; a switch; an access switch; a gateway; and a router. Device 104 and devices 110 can communicate with each other via a network 120. For example, device 110 can include: an access point 112, which communicates via a link 122 with device 104; a laptop 114, which communicates via a link 124 with device 104; a switch 116, which communicates via a link 126 with device 104; and a monitoring sensor 118, which communicates via a link 128 with device 104.

In environment 100, during operation, each of devices 112-118 can operate only in isolation from the other devices of 112-118 and may only report it own results via a specific system to be accessed via a cloud, backend, or other server and subsequently displayed on display 108. If an issue arises with a respective link to device 104 (e.g., with link 126 for switch 116), the device associated with that respective link (e.g., switch 116) may be unable to perform necessary actions, such as: obtaining a configuration file from device 104; recording network metrics monitored by switch 116; and reporting any device-specific or general network issues observed by switch 116 based on its position in the overall network topology for devices 110.

In addition, these metrics, issues, or results may be reported by each individual isolated device and may only be accessed via separate user dashboards or backend systems. For example, display 108 may include information which must be accessed via four separate systems, including: access point 112 ("system_1"): monitored network information 170; laptop 114 ("system_2"): monitored network information 172; switch 116 ("system_3"): monitored network information 174; and monitoring sensor 118 ("system_4"): monitored network information 176. The information (170-176) from the four separate systems may be displayed in a non-cohesive manner which may only provide information about each device but does not provide an overall view of the network as a whole.

Thus, environment 100 depicts how each of devices 112-118 can perform its own monitoring in isolation from the other devices, where the user review of the monitored information can also be performed in isolation from disparate backend systems.

Figure 2:
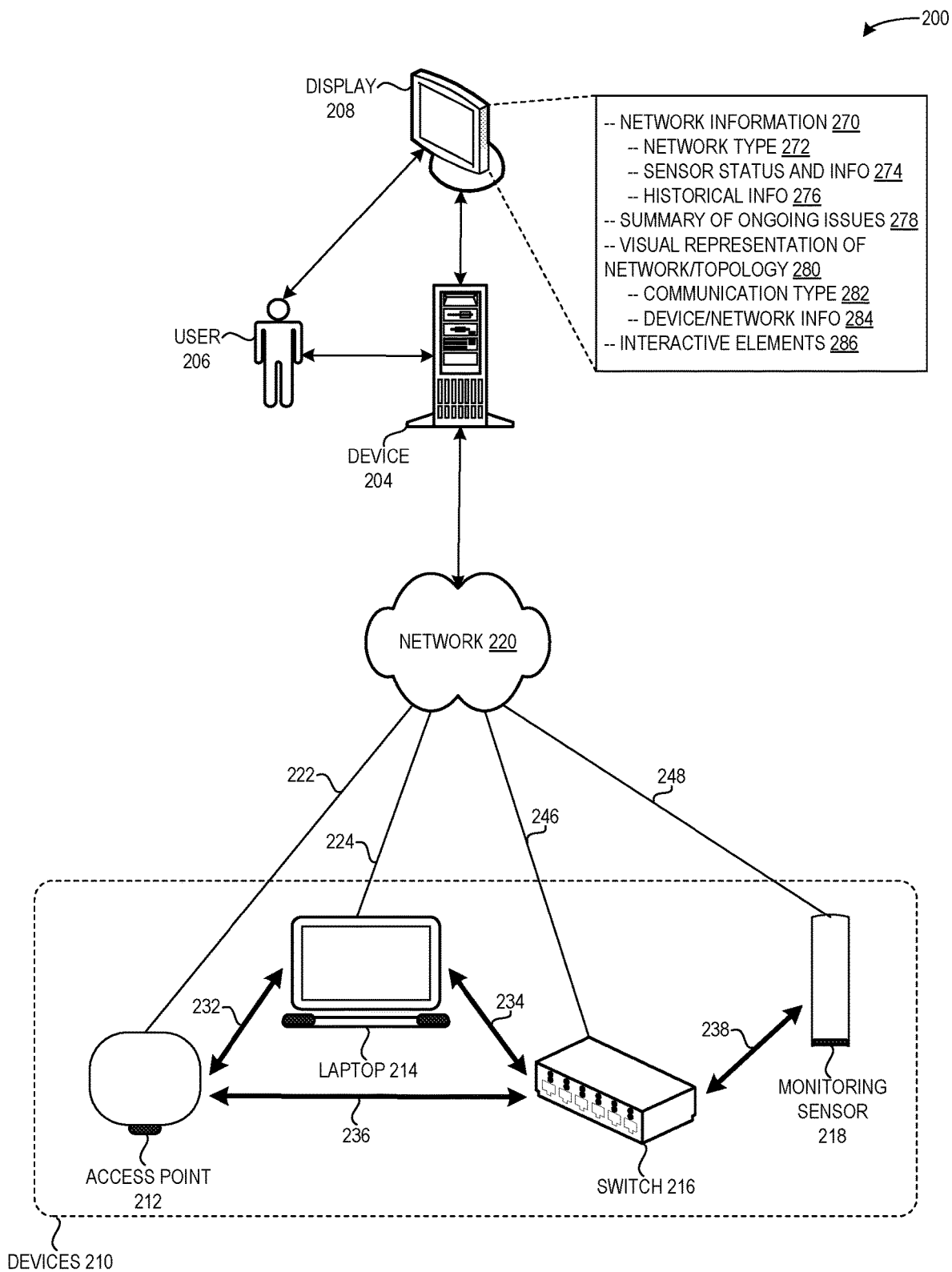
FIG. 2 illustrates an environment which facilitates a mechanism for an intelligent and comprehensive monitoring system using peer-to-peer agents, in accordance with an aspect of the present application.

The described aspects provide an integration of peer-to-peer agents which can provide collaborative monitoring of a network. FIG. 2 illustrates an environment 200 for an intelligent and comprehensive monitoring system using peer-to-peer agents, in accordance with an aspect of the present application. Environment 200 can include: a device 204 associated with a user 206 and a display 208; and devices 210. Device 204 can be a cloud server or can represent a cloud-based service or set of servers. Devices 210 can include a variety of devices, including but not limited to: an endpoint device; a non-endpoint device; an intermediate device; an edge or leaf node; an internal or branch node; an access point; a switch; an access switch; a gateway; and a router. Device 204 and devices 210 can communicate with each other via a network 220. For example, devices 210 can include: an access point 112, which communicates via a link 222 with device 204; a laptop 214, which communicates via a link 224 with device 204; a switch 216, which communicates via a link 226 with device 204; and a monitoring sensor 218, which communicates via a link 228 with device 204. Display 208 can include information as described below in relation to FIG. 3.

In environment 100, during operation, each of devices 112-118 can operate in a collaborative manner to provide an intelligent and comprehensive monitoring system, in contrast to the isolated monitoring depicted above in relation to environment 100 of FIG. 1. Devices 210 of FIG. 2 can perform several operations which facilitate this collaborative monitoring. Laptop 214 can illustrate an exemplary device of devices 210. During operation, laptop 214 can deploy a software-based network-monitoring agent. Laptop 214 can discovery a plurality of peer devices on a same local network as laptop 214 without receiving a cloud-orchestrated instruction. That is, based on the deployed software agent, laptop 214 can discover or identify peer devices using a protocol such as: a multicast domain name system (mDNS) protocol; a Zigbee protocol; a Bluetooth Mesh protocol; and a broadcast Ethernet protocol. Other protocols may also be used by laptop 214 or any of devices 210 to discover its peers. In addition, other radio frequency (RF)-based communications (e.g., Zigbee) may be used for communication between devices on different networks. An exemplary result of the discovery process can include: laptop 214 discovering at least access point 212 and switch 216 as its peer devices, which communication may occur via, respectively, links 232 and 234; access point 212 discovering at least laptop 214 and switch 216, which communication may occur via, respectively, links 232 and 236; and switch 216 discovering at least access point 212, laptop 214, and monitoring sensor 218, which communications may occur via, respectively, links 236, 234, and 238.

Because this discovery process may be initiated due to the deployed software-based agent on a device, this discovery process can enable the devices (including endpoints) to be discovered and determine their potential peers without requiring a centrally orchestrated instruction, e.g., a cloud-orchestrated instruction from device 204. Once the peers have been identified, the system can use the peer-to-peer agents to provide collaborative monitoring, e.g., when a link from one device (214) to the server (204) fails, as described below in relation to FIG. 3.

Each respective device (e.g., laptop 214) may obtain a device-specific configuration file from server 204. The configuration file may include or indicate network metrics to be monitored by a respective device. The configuration file may also include one or more condition/action pairs, e.g., a trigger or condition and a corresponding action to be performed. The conditions/actions may each specify or indicate user-defined or system-configured elements, e.g., rules, thresholds, network metrics to be monitored, messages or notifications to be sent to one or more other devices, processes to be initiated, etc.

Figure 3:
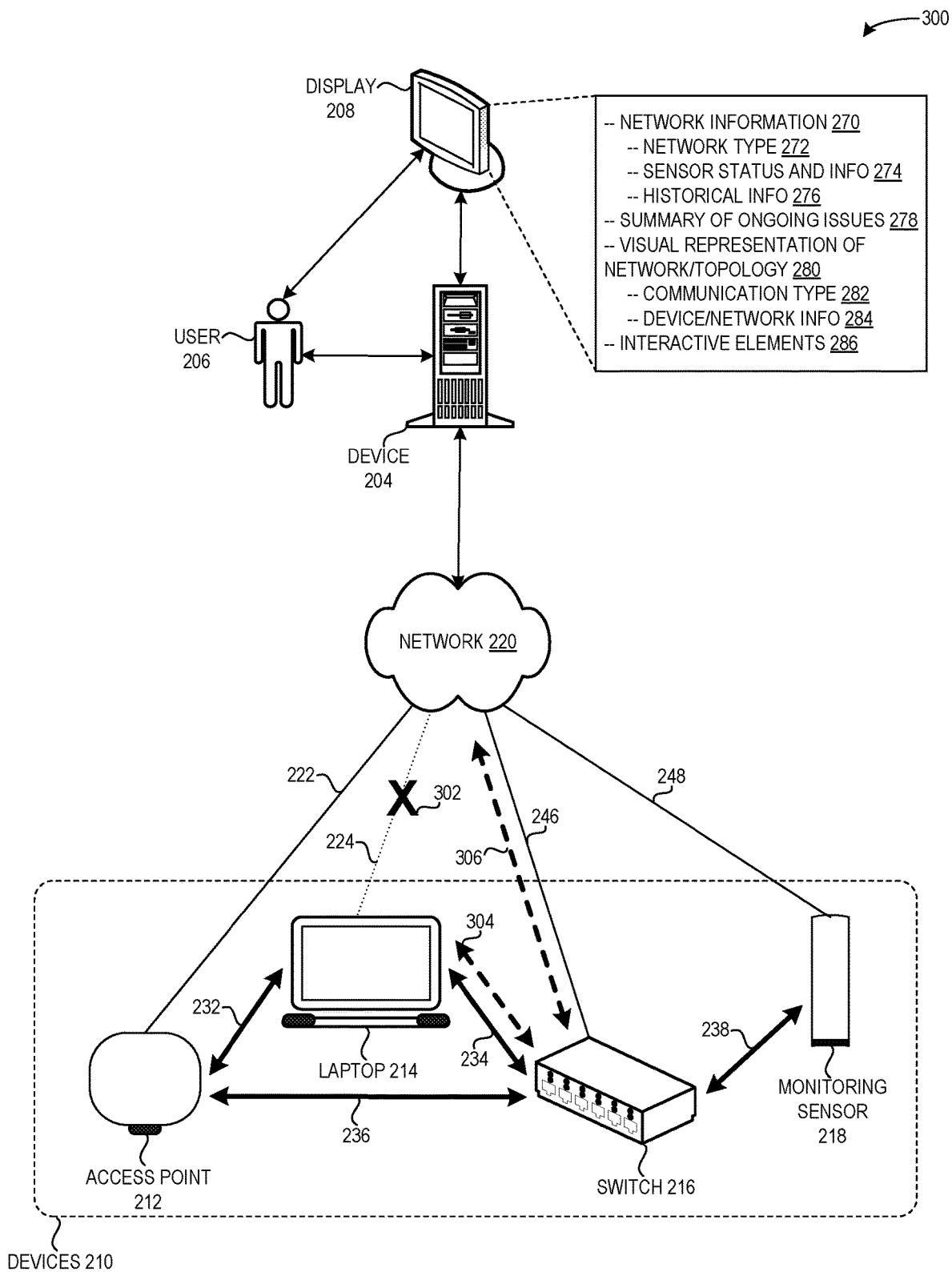
FIG. 3 illustrates the environment of FIG. 2, including communication between peer devices, in the event of a failed uplink from a device, in accordance with an aspect of the present application.

FIG. 3 illustrates environment 200 of FIG. 2, including communication between peer devices, in the event of a failed uplink from a device, in accordance with an aspect of the present application. In FIG. 3, if laptop 214 determines successful direct communication with device 204, laptop 214 can obtain its configuration file from device 204 (as described above). However, if laptop 214 determines unsuccessful direct communication with device 204 (e.g., link 224 from laptop 214 to device 204 fails, as indicated by a bold "X" 302), laptop 214 can select a peer from its list of previously identified peers. Laptop 214 can select the peer based on, e.g.: a ranked order for the discovered plurality of peer devices; and a current network metric associated with one or more of the discovered plurality of peer devices. For example, laptop 214 can maintain, in a local cache, a list of its peer devices. The list may be prioritized, ranked, or ordered by the number of hops or latency associated with each of its identified peers. Laptop 214 can use the list to determine alternate paths of communication for both receiving data from and transmitting data to the server (e.g., device 204). That is, laptop 214 can attempt to find a peer device from the list that has an intact uplink or route via which to obtain the configuration file (or to transmit its stored monitored network metrics and results, as described below).

Laptop 214 can communicate with device 204 via the selected peer device. For example, laptop 214 can send a request for the configuration file to its peer device switch 216 (via a communication 304), which can send the request along to device 204 (via a communication 306). Device 204 can return the requested configuration file back through switch 216 using the same communications 306 and 304 to laptop 214. The described aspects can thus provide autonomous edge configuration for mutual network debugging and monitoring.

Once laptop 214 has obtained its configuration file, laptop 214 can monitor the network metrics indicated in the obtained configuration file. Laptop 214 may be configured to report results relating to the monitored network metrics at periodic intervals, based on a predetermined time, or in response to detecting a user-defined or a system-configured condition specified in the configuration file. Detecting, determining, or triggering a user-defined or system-configured condition may result in laptop 214 performing a specific corresponding action, such as obtaining additional network metrics. Exemplary condition/action pairs are described below.

If laptop 214 determines successful direct communication with device 204, laptop 214 can transmit to device 204 data associated with the monitored metrics and the action (similar to the direct communication described above for obtaining the configuration file from device 204). However, if laptop 214 determines unsuccessful direct communication with device 204 (e.g., link 224 from laptop 214 to device 204 fails, as indicated by bold "X" 302), laptop 214 can select a peer (e.g., switch 216) from its list of previously identified peers. Laptop 214 can select the peer based on the factors described above in relation to FIG. 2. Laptop 214 can communicate with device 204 via the selected peer device. In this example, laptop 214 can transmit the data associated with the monitored metrics and the action (if any) to the server via the selected peer device (e.g., switch 216). Note that while the same peer device (i.e., switch 216) is depicted as the selected device for both cases of unsuccessful direct communication (i.e., obtaining the configuration file and transmitting monitored network metrics), the selected peer device may be any of the previously identified peer devices of laptop 214.

The transmitted data associated with the monitored metrics, and, in some instances, the action, can include test result metrics such as latency, round trip time, path convergence, and routes taken. These metrics (i.e., the "total test case") can be confirmed or corroborated by the actual elements or devices involved in the transmission of the data. Because each element or device can corroborate the total test case, the system can account for the network in its entirety or as a whole. For example, low throughput results for a client at the edge may have further depth introduced by offering packet fragmentation metrics on the appropriate traffic flow. In addition, the system can corroborate QoS policies whereby traffic emanating from an edge device or testing agent can be marked and throughput thresholds can be tested. By providing for representation at the traffic source and through the transmission infrastructure, the described aspects can result in a deeper insight not only on a variety of tests, including routing tests, bandwidth tests, latency and round-trip tests, but also on the status or confirmation of the enforcement of various policies.

The system can display (e.g., on display 208 of FIGS. 2 and 3) various information, including aggregated network monitoring data associated with a device (e.g., 214) as well as information related to the transmitted data associated with the monitored metrics and the action (if any). The system can display the information in connection with a network topology (e.g., as a geographical map with marked physical locations of a device, a group of devices, a network, or a group of networks). The information displayed can include, e.g.: network information 270, which can include a network type 272, sensor status and information 274, and historical information 276; a summary of ongoing issues 278; and a visual representation of the network/topology 280, which can include a communication type 282 and device/network information 284. The information displayed can also include a number associated with a device, a group of devices, a network, or a group of networks. The information displayed can further include: a link or connection between two devices in the network; and a link or connection between two networks within the overall network.

The information displayed can include interactive elements 286, which allow user 206 to view one or more of: a statistic or status associated with the link or connection; a rate of receiving or transmitting data; a rate of dropped packets; whether an external service is available; whether an unexpected captive portal or proxy exists; whether a power outage is detected; and whether a response is received from a Dynamic Host Configuration Protocol (DHCP) server. The system can display this information on a user dashboard, as described below in relation to FIG. 4.

As described above, the configuration file can include condition/action pairs. That is, any metric or test case can correspond to a condition which, when detected, can trigger a proactive or immediate action based on a predetermined threshold, e.g., as defined in the configuration file. One example of a condition/pair can be a device detecting a condition of its failed uplink to the server or cloud backend, which triggers the corresponding action of checking the uplink of one or more of the peer devices of the device. Another example can be the device discovering an issue with a peer device (e.g., the condition being that the rate of dropped packets on a switch exceeds a predetermined threshold), which triggers the corresponding action of running a CLI command on the switch to obtain related counters or other interface metrics. In another example, the device can detect the condition of a failed uplink on one or more of its peer devices, which triggers the corresponding action of performing tests on a certain port of the determined peer device and storing the results on the device itself. Yet another example can be the device verifying the reachability of a critical internal server from different hosts/paths in the network, where the verification results can define various actions to be taken by the device or actions to be performed by other devices to address any issues related to the verification results.

In these examples, the device can detect a condition which corresponds to a monitored network metric associated with the device itself. For the corresponding triggered action, the device can perform a corresponding first action directly or can inform a peer device to perform a corresponding second action. The device can also detect a condition which corresponds to a monitored network metric associated with a peer device. For the corresponding triggered action, the device can perform a corresponding third action directly or can inform the peer device or another peer device to perform a corresponding fourth action. As an example, a device can detect a condition whereby the result of a test against a particular route drops below a predetermined level, which triggers a route analysis from a particular switch (i.e., a peer device). In other words, when the device detects the condition of the monitored network metric being met, the device can inform its peer device—the switch—to perform a particular action related to route analysis. In some aspects, the device can also inform a different peer device to perform a predetermined corresponding to the condition.

Furthermore, the described aspects can use the aforementioned techniques to aggregate monitored network metrics and can further transmit or apply the aggregated information to an external monitoring entity, e.g., in parallel to allow an external monitoring assistant (not shown in FIGS. 2 and 3) to access device 204 and apply analytics to the aggregated information.

The described aspects can further enrich any network issues uncovered by client testing applications via issue sharing and confirmation routines which can be executed on parallel network infrastructure components, e.g., switches, access points, or other network nodes which may be responsible for processing traffic emanating from a principal client. For example, a first agent may be installed on a UXI sensor, and the UXI sensor may be running on a user device and monitoring a certain network. If the first agent discovers an issue with the certain network which the user device is monitoring and wishes to provide a complete report of the discovered issue immediately (i.e., in real time or at the time of the discovery), the first agent may need to request that a second agent (e.g., a UXI-Network Analytics Engine (NAE)) running on a local switch check the configuration or traffic patterns by running a set of command line interface (CLI) commands. This communication can result in providing an intelligent and comprehensive monitoring report by aggregating information from distinct peer devices at the time that an issue occurs and by presenting/displaying the aggregated information in a cohesive manner to a network administrator or other end user. An exemplary display is described below in relation to FIG. 4.

Figure 4:
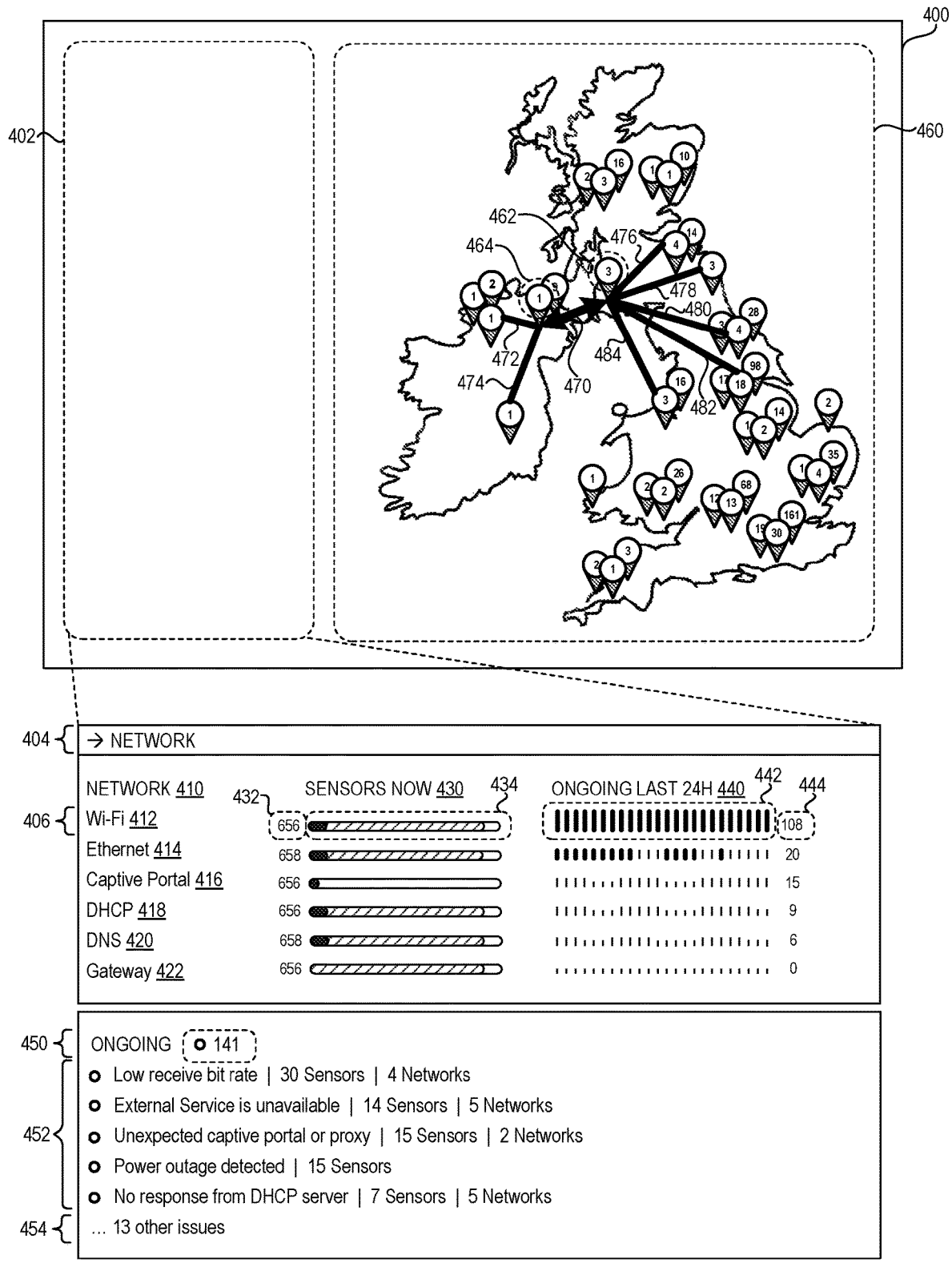
FIG. 4 illustrates an exemplary user dashboard with displayed results from an intelligent and comprehensive monitoring system, in accordance with an aspect of the present application.

Thus, as depicted in FIGS. 2-4, the described aspects can perform intelligent and comprehensive network monitoring via multiple "monitoring systems," where each device or group of devices can be considered a monitoring system, instead of the isolated network monitoring performed separately by multiple single endpoints or devices depicted in relation to FIG. 1

Exemplary Dashboard Results and User Interaction

FIG. 4 illustrates an exemplary user dashboard 400 with displayed results from an intelligent and comprehensive monitoring system, in accordance with an aspect of the present application. User dashboard can be displayed on a display screen of a device associated with a user (or of a server accessible to or authenticated for use by the user), e.g., as described above in relation to display 208 of FIGS. 2 and 3. User dashboard 400 can include an information display portion 402 and a visual representation 460 of the network topology. Information display portion 402 can include a network 404 section which summarizes information about a respective network type including: the number of currently operating sensors and the status for the respective network type; and a historical status of the respective network for a certain number of prior time intervals (e.g., hours). Network 404 section can include rows which indicate a respective network type, with columns which indicate: a network type 410; a column with a visual representation and number of currently operating sensors (sensors now 430); and a column with a historical status (ongoing last 24H 440). The network types (410) can include: Wi-Fi 412; Ethernet 414; Captive Portal 416; Dynamic Host Configuration Protocol (DHCP) 418; Domain Name System (DNS) 420; and Gateway 422.

Each row can include the information described above. For example, a row 406 for Wi-Fi 412 can include: a number of sensors currently operating, as a value of 656 (element 432); a bar or other visual representation (element 434) which indicates different statuses relative to the total number of currently operating sensors, e.g.: a filled-in pattern can indicate a relative number of offline sensors or sensors from which no signal is currently being detected; a diagonally-striped fill pattern can indicate a relative number of online sensors or sensors from which data is currently being received; and a non-filled in or blank pattern can indicate a relative number of sensors which are currently being booted up or undergoing diagnosis.

Row 406 for Wi-Fi 412 can further include: a visual representation (element 442) of the status of the overall respective network over a most recent historical period, e.g., 24 hours, where a bar can represent each hour, and a shading or color (not indicated) of the bar can represent the overall health of the respective network during that hour; and a number relating to the overall status of the respective network, as a value of 108 (element 444), which value can indicate e.g., a number of sensor issues or errors in the last 24 hours, a number of resets or reboots related to the respective network, etc.

Information display portion 402 can also include an ongoing section 450, which summarizes the number of issues which may be currently occurring or have not yet been resolved. Rows 452 can include information related to certain issues and can list the number of sensors and networks involved in the issue. For example, as shown in rows 452: an ongoing issue of a "low receive bitrate" may involve 30 sensors and 4 networks; an ongoing issue of a "low receive bitrate" may involve 30 sensors and 4 networks; an ongoing issue of a "external service is unavailable" involve 14 sensors and 5 networks; an ongoing issue of a "unexpected captive portal or proxy" may involve 15 sensors and 2 networks; an ongoing issue of a "power outage detected" may involve 15 sensors; and an ongoing issue of a "no response from DHCP server" may involve 7 sensors and 5 networks. Other issues may also be indicated (row 454).

Visual representation 460 of the network topology can be displayed as a map, with the physical location of each network marked by a label (e.g., labels 462 and 464). Different types of communication links between networks can be indicated with different types of arrows, such as a double-sided arrow (e.g., 470) to indicate a first type of communication and a straight bold line with no arrows (e.g., 478 and 480) to indicate a second type of communication link. The number or value displayed in each label can correspond to various values and each label may be colored or indicated in a different visual manner. Examples of the various types of values may include: a number of devices in a respective network at the marked location; a number of sub-networks within the respective network; a number of sensors associated with the respective network; and a number of current outages at the respective network. Various colors (not shown) or other visual indicators (e.g., striping, patterns, shading, highlights, etc.) may be used to indicate the type of the value being displayed. In some aspects, the user may use an input device (e.g., by hovering over a label with a mouse or entering a certain key stroke or pattern on a keyboard) or a finger gesture (e.g., by swiping, hovering, tapping, or holding a portion of a touch-sensitive display screen) to view or change the view of the displayed labels.

The user can also use interactive elements (not shown) on user dashboard 400 to view specific or detailed information about a particular sensor, device, or communication link within a respective network, e.g., by clicking on label 462 and further clicking through a hierarchically organized view of the respective network and related information, which can be displayed in portion 402, on a further scrollable area of portion 402, or as an overlay on portion 402.

Thus, user dashboard 400 can provide a user with a high-level site-to-site view of the overall network (e.g., a customer's network spanning multiple geographic locations). User dashboard 400 can also provide the user with an in-depth overview of the complete network and provide statistics on various links (e.g., via information display portion 402 and as described above). The various capabilities of user control via dashboard 400 can enhance the performance of the comprehensive and intelligent monitoring system described herein.

Figure 5A:
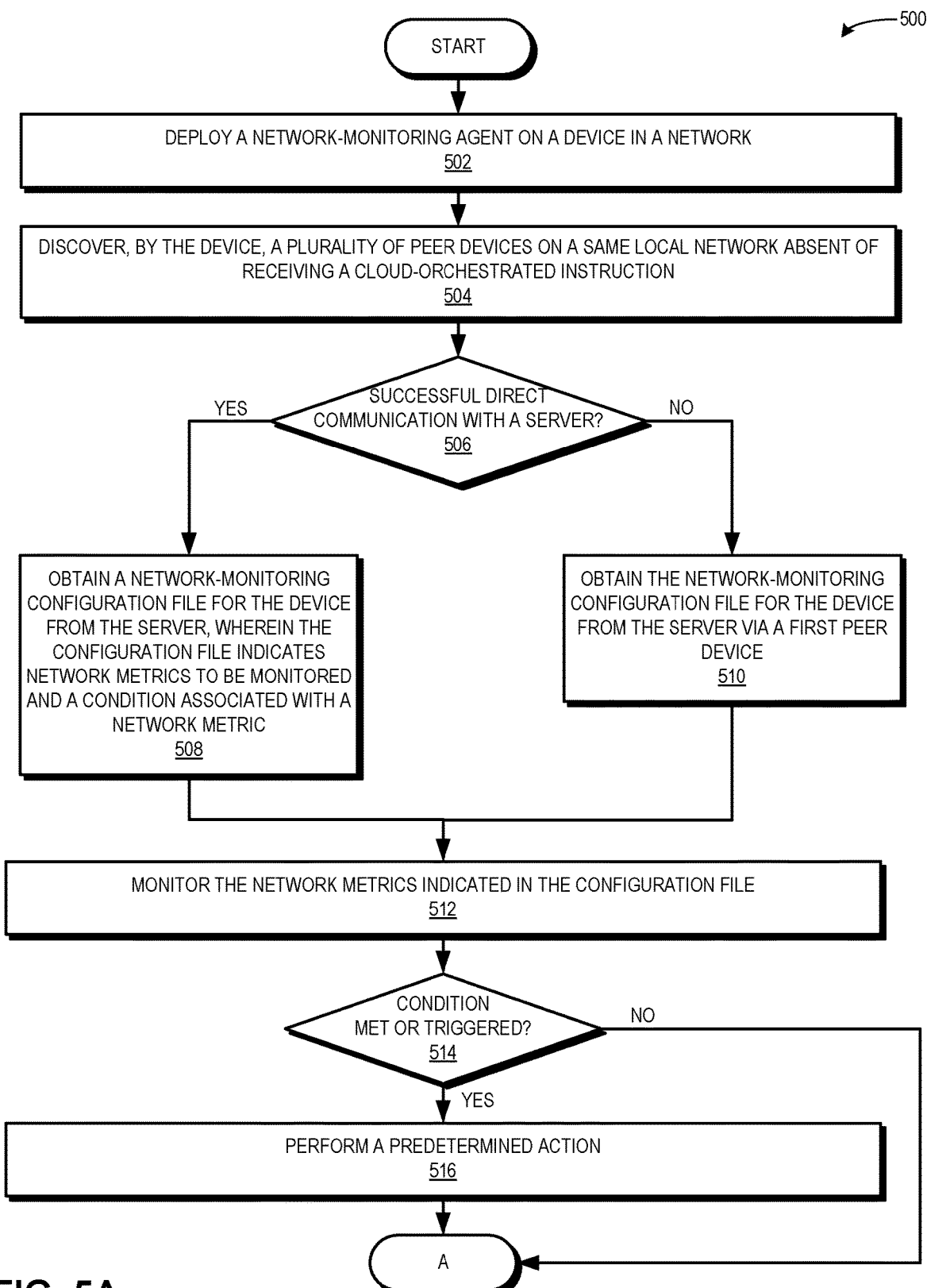
FIG. 5A presents a flowchart illustrating a method which facilitates a mechanism for an intelligent and comprehensive monitoring system using peer-to-peer agents in a network, in accordance with an aspect of the present application.

Exemplary Method for Facilitating an Intelligent and Comprehensive Monitoring System FIG. 5A presents a flowchart 500 illustrating a method which facilitates a mechanism for an intelligent and comprehensive monitoring system using peer-to-peer agents in a network, in accordance with an aspect of the present application. During operation, the system deploys a network-monitoring agent on a device in a network (operation 502). The system discovers, by the device, a plurality of peer devices on a same local network absent of receiving a cloud-orchestrated instruction (operation 504). If the system determines a successful direct communication with a server (decision 506), the system obtains a network-monitoring configuration file for the device from the server, wherein the configuration file indicates network metrics to be monitored and a condition associated with a network metric (operation 508). If the system determines an unsuccessful direct communication with the server (decision 506), the system obtains a network-monitoring configuration file for the device from the server via a first peer device (operation 510). The system can determine or select the first peer device based on the exemplary criteria described above.

The system monitors the network metrics indicated in the configuration file (operation 512). If the condition corresponding to a monitored network metric is met or triggered (decision 514), the system performs a predetermined action (operation 516) and the operation continues at Label A of FIG. 5B. If the condition corresponding to a monitored network metric is not met or triggered (decision 514), the operation continues at Label A of FIG. 5B.

Figure 5B:
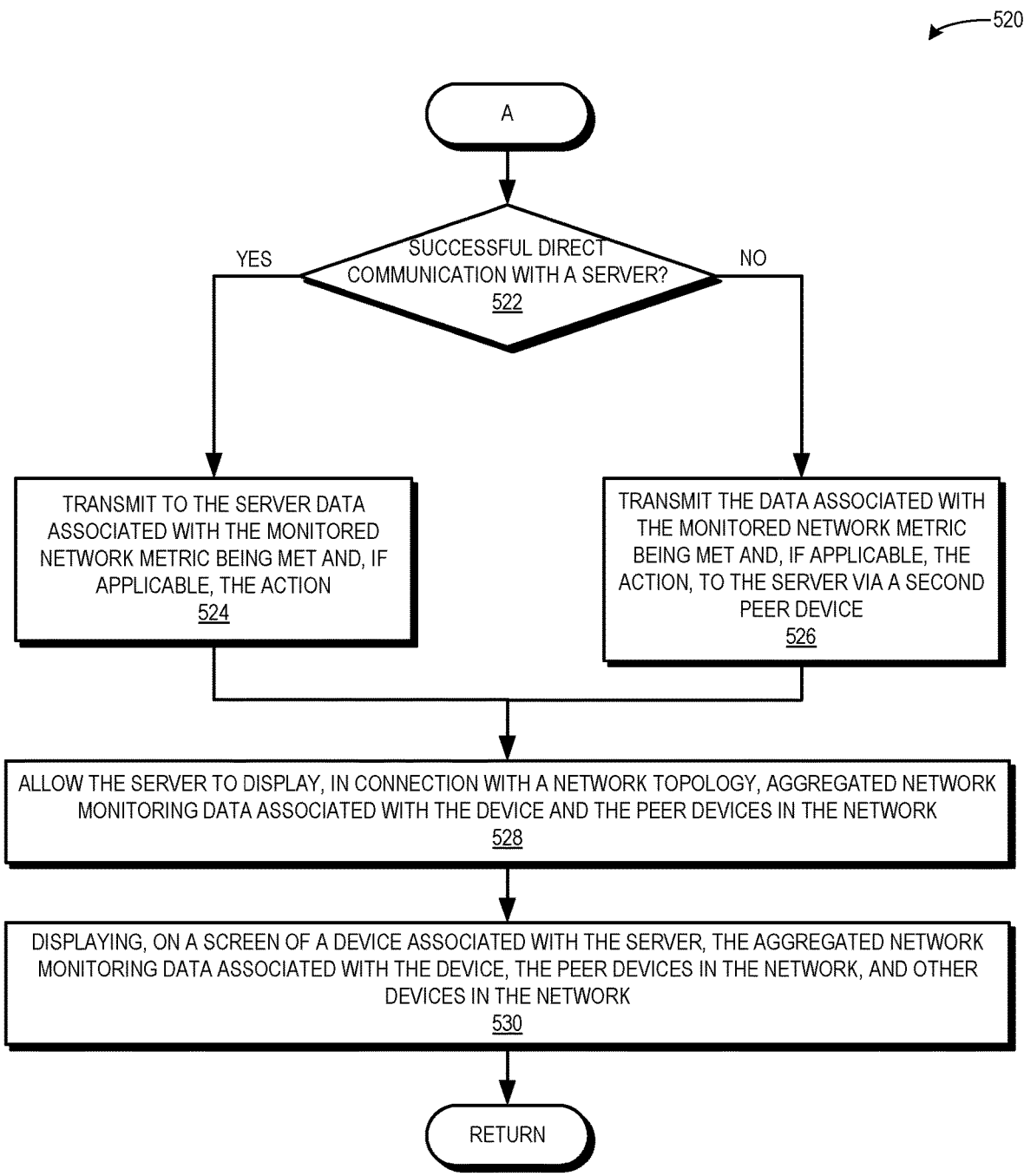
FIG. 5B presents a flowchart illustrating a method which facilitates a mechanism for an intelligent and comprehensive monitoring system using peer-to-peer agents in a network, in accordance with an aspect of the present application.

FIG. 5B presents a flowchart 520 illustrating a method which facilitates a mechanism for an intelligent and comprehensive monitoring system using peer-to-peer agents in a network, in accordance with an aspect of the present application. During operation, if the system determines successful direct communication with the server (decision 522), the system transmits to the server data associated with the monitored metrics and the action (operation 524). If the system determines unsuccessful direct communication with the server (decision 522), the system transmits the data to the server via a second peer device (operation 526). The system can determine or select the first peer device based on the exemplary criteria described above. The system allows the server to display, in connection with a network topology, aggregated network monitoring data associated with the device and the peer devices in the network (operation 528). The system displays, on a screen of a device associated with the server, the aggregated network monitoring data associated with the device, the peer devices in the network, and other devices in the network (operation 530). The operation returns.

Thus, by deploying the network-monitoring agent to devices in a network and by allowing peer-to-peer discovery in order to use peers as devices by which to communicate configuration information and measured results or monitored data with a central cloud server (or other central server or backend), and further by using intelligent monitoring (e.g., the monitored or triggered conditions/actions described above), the described aspects can facilitate peer-to-peer collaborative, intelligent, and comprehensive monitoring of a network.

Figure 6:
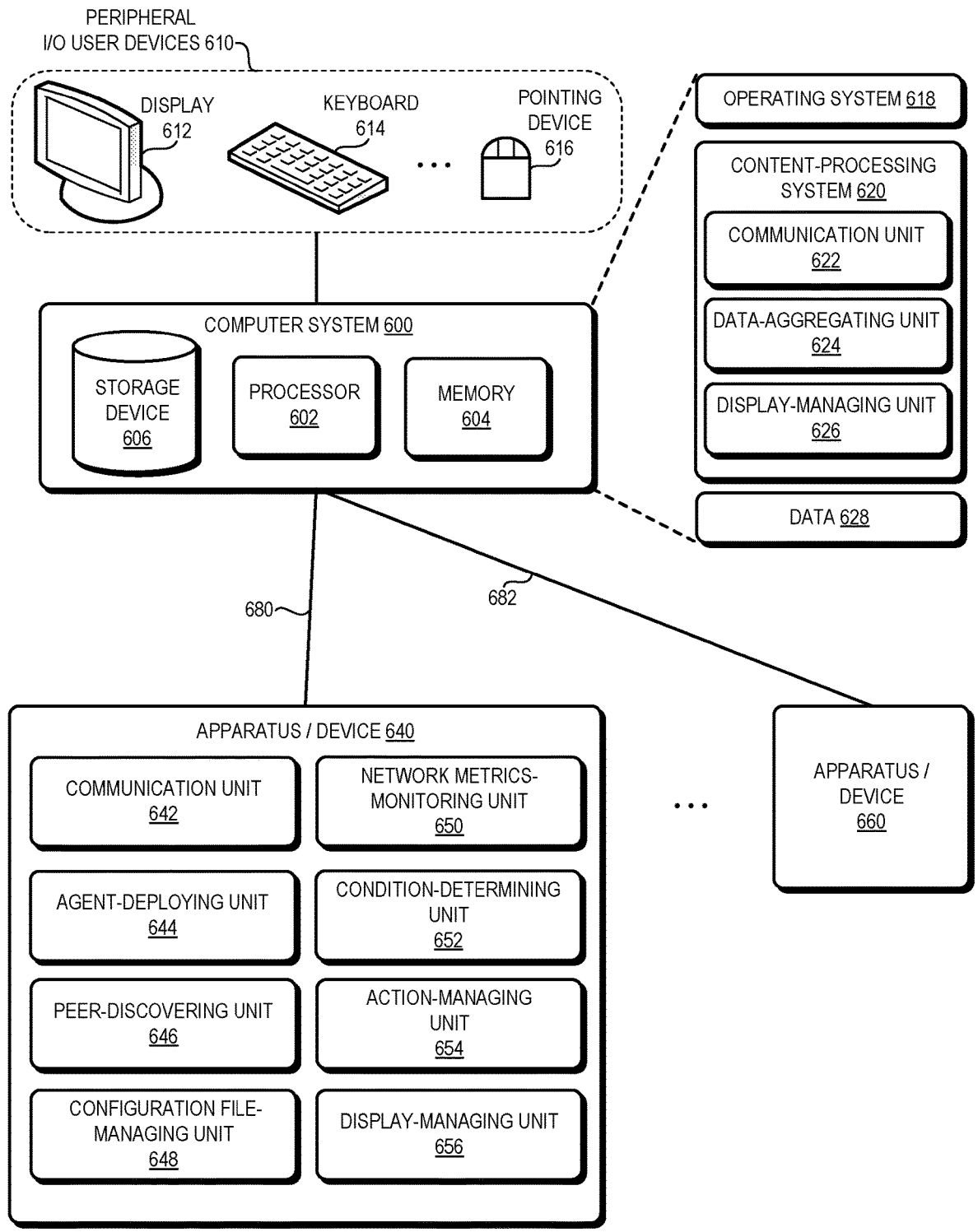
FIG. 6 illustrates a computer system and apparatus which facilitate a mechanism for an intelligent and comprehensive monitoring system using peer-to-peer agents in a network, in accordance with an aspect of the present application.

Exemplary System and Apparatus for Facilitating an Intelligent and Comprehensive Monitoring System FIG. 6 illustrates a computer system 600 and apparatus 640 which facilitate a mechanism for an intelligent and comprehensive monitoring system using peer-to-peer agents in a network, in accordance with an aspect of the present application. Computer system 600 includes a processor 602, a memory 604, and a storage device 606. Memory 604 can include a volatile memory (e.g., RAM) that serves as a managed memory, and can be used to store one or more memory pools. Furthermore, computer system 600 can be coupled to peripheral input/output (I/O) user devices 610 (e.g., a display device 612, a keyboard 614, and a pointing device 616). Computer system 600 can correspond to device 104 of FIG. 1 and peripheral I/O user devices 610 can correspond to display 108 of FIG. 1. Computer system 600 can communicate with a plurality of apparatuses (or devices), e.g., apparatus 640 and apparatus 660, via, respectively, communication links 680 and 682. Apparatuses 640 and 660 can correspond to devices 110 of FIG. 1. Storage device 606 can store an operating system 618, a content-processing system 620, and data 628.

Content-processing system 620 can include instructions, which when executed by computer system 600, can cause computer system 600 to perform methods and/or processes described in this disclosure. Specifically, content-processing system 620 may include instructions for sending and/or receiving data packets to/from other network nodes across a computer network (communication unit 622). A data packet can include configuration information, network metrics or statistics, data associated with a device or a peer device, data associated with a condition/action in a configuration file, and data related to the operations described herein.

Content-processing system 620 can further include instructions for aggregating data received from one or more apparatuses or devices (e.g., 640/660) (data-aggregating unit 624). Content-processing system 620 can include instructions for displaying, managing, updating, and modifying data displayed or to be displayed on a screen using I/O devices 610 (display-managing unit 626). Content-processing system 620 can also include instructions for handling communications with an external entity (communication unit 622), e.g., an entity which may retrieve aggregated network-monitoring data or metrics stored by computer system 600 and perform further analytics on the retrieved data.

Data 628 can include any data that is required as input or that is generated as output by the methods and/or processes described in this disclosure. Specifically, data 634 can store at least: data; network metrics; device-related information; and information related to displaying network metrics or network topology information.

Apparatus 640 (as an example of a plurality of apparatuses/devices which can also include, e.g., 660) can comprise a plurality of units or components which may communicate with one another via a wired, wireless, quantum light, or electrical communication channel. Apparatus 640 may be realized using one or more integrated circuits, and may include fewer or more units or apparatuses than those shown in FIG. 6. Further, apparatus 600 may be integrated in a computer system, or realized as a separate device or devices capable of communicating with other computer systems and/or devices. Specifically, apparatus 600 can comprise units 642-656 which perform functions or operations as described herein, including: a communication unit 642 for communicating with one or more other devices or computer systems; an agent-deploying unit 644 for deploying a network-monitoring agent on a device in a network; a peer-discovering unit 646 for discovering, by the device, a plurality of peer devices on a same local network absent of receiving a cloud-orchestrated instruction; a configuration file-managing unit 648 for obtaining a network-monitoring configuration file for the device from the server (wherein the configuration file indicates network metrics to be monitored and a condition associated with a network metric) or from the server via a first peer device, based on a determination of whether direction communication exists with the server made by communication unit 642; a network metrics-monitoring unit for monitoring the network metrics indicated in the configuration file; a condition-determining unit 652 to determine whether a condition corresponding to a monitored network metric is met; an action-managing unit 654 for performing a predetermined action; the communication unit 642 further for transmitting data associated with the monitored metrics and the action to the server or to the server via a second peer device, based on a determination of whether direction communication exists with the server made by communication unit 642; and a displaying managing unit 656 for managing display of data by the server by allowing the server to display, in connection with a network topology, aggregated network monitoring data associated with the device and the peer devices in the network.

In general, the disclosed aspects provide a method, non-transitory computer-readable storage medium, system, and apparatus for facilitating peer-to-peer collaborative monitoring of a network. In one aspect, the system deploys a network-monitoring agent on a device in a network. The system discovers, by the device, a plurality of peer devices on a same local network absent of receiving a cloud-orchestrated instruction. Responsive to successful direct communication with a server, the system obtains a network-monitoring configuration file for the device from the server, wherein the configuration file indicates network metrics to be monitored and a condition associated with a network metric. Responsive to unsuccessful direct communication with the server, the system obtains the configuration file from the server via a first peer device. The system monitors the network metrics indicated in the configuration file. Responsive to the condition corresponding to a monitored network metric being met, the system performs a predetermined action. Responsive to successful direct communication with the server, the system transmits to the server data associated with the monitored metrics and the action. Responsive to unsuccessful direct communication with the server, the system transmits the data to the server via a second peer device, thereby allowing the server to display, in connection with a network topology, aggregated network monitoring data associated with the device and the peer devices in the network.

In a variation on this aspect, when the condition corresponding to the monitored network metric being met is associated with the device, the action comprises at least one of: the device performing a first action directly; and the device informing a peer device to perform a second action.

In a further variation on this aspect, when the condition corresponding to the monitored network metric being met is associated with a peer device, the action comprises at least one of: the device performing a third action directly; and the device informing the peer device or another peer device to perform a fourth action.

In a further variation, the condition corresponding to the monitored network metric being met is based on at least one of: a system-configured condition for a system-configured action or a user-defined action; and a user-defined condition for a system-configured action or a user-defined action.

In a further variation, the system deploys the network-monitoring agent on a plurality of devices in the same local network, wherein the plurality of devices include the peer devices. The system monitors, by a respective device, network metrics based on a configuration file for the respective device. The system transmits, by the respective device, the monitored network metrics to the server or to the server via one or more peer devices of the respective device.

In a further variation, the device, the peer devices, and other devices in the same local network comprise at least one of: an endpoint device; an intermediate device; an edge or leaf node; an internal or branch node; an access point; a switch; an access switch; a gateway; and a router.

In a further variation, the system discovers the peer devices of the device based on a protocol comprising at least one of: a multicast domain name system (mDNS) protocol; a Zigbee protocol; a Bluetooth Mesh protocol; and a broadcast Ethernet protocol.

In a further variation, the system displays, on a screen of a device associated with the server, the aggregated network monitoring data associated with the device, the peer devices in the network, and other devices in the network. The aggregated network monitoring data is displayed in connection with the network topology. The displayed aggregated network monitoring data indicates at least one of: a visual representation of the network topology; a physical location of a device or a group of devices in the network; a number associated with the device or group of devices; and a link or connection between two devices in the network.

In a further variation, the display further includes interactive user elements which allow a user of the device associated with the server to view one or more of: a statistic or status associated with the link or connection; a rate of receiving or transmitting data; a rate of dropped packets; whether an external service is available; whether an unexpected captive portal or proxy exists; whether a power outage is detected; and whether a response is received from a Dynamic Host Configuration Protocol (DHCP) server.

In a further variation, the system transmits the data associated with the monitored metrics and the action to an external monitoring entity via the server.

In a further variation, the system stores, in a local cache of the device, information associated with the discovered plurality of peer devices.

In a further variation, the system determines the first peer device and the second peer device based on at least one of: a ranked order for the discovered plurality of peer devices; and a current network metric associated with one or more of the discovered plurality of peer devices.

In another aspect, a non-transitory computer-readable storage medium stores instructions that when executed by a computer cause the computer to perform the method described above, including in relation to FIGS. 2, 3, 4, 5A, and 5B.

In yet another aspect, an apparatus comprises: an agent-deploying unit to deploy a network-monitoring agent on a device in a network; a peer-discovering unit to discover, by the device, a plurality of peer devices on a same local network absent of receiving a cloud-orchestrated instruction; a communication unit to determine a successful or unsuccessful direction communication with a server; a configuration file-managing unit to: responsive to the communication unit determining successful direct communication with the server, obtain a network-monitoring configuration file for the device from the server, wherein the configuration file indicates network metrics to be monitored and a condition associated with a network metric; and responsive to the communication unit determining unsuccessful direct communication with the server, obtain the configuration file from the server via a first peer device; a network metrics-monitoring unit to monitor the network metrics indicated in the configuration file; a condition-determining unit to determining that a monitored network metric is met; an action-managing unit to, responsive to the condition-determining unit determining that a condition corresponding to the monitored network metric is met, perform a predetermined action; the communication unit further to: responsive to determining successful direct communication with the server, transmit to the server data associated with the monitored metrics and the action; and responsive to determining unsuccessful direct communication with the server, transmitting the data to the server via a second peer device; and a display-managing unit to allow the server to display, in connection with a network topology, aggregated network monitoring data associated with the device and the peer devices in the network.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method for facilitating peer-to-peer collaborative monitoring of a network, the method comprising:
deploying a network-monitoring agent on a device in a network;
discovering, by the device, a plurality of peer devices on a same local network absent of receiving a cloud-orchestrated instruction;
responsive to successful direct communication with a server, obtaining a network-monitoring configuration file for the device from the server, wherein the configuration file indicates network metrics to be monitored and a condition associated with a network metric;
responsive to unsuccessful direct communication with the server, obtaining the configuration file from the server via a first peer device;
monitoring the network metrics indicated in the configuration file;
responsive to the condition corresponding to a monitored network metric being met, performing a predetermined action;
responsive to successful direct communication with the server, transmitting to the server data associated with the monitored metrics and the action; and
responsive to unsuccessful direct communication with the server, transmitting the data to the server via a second peer device,
the transmitted data allowing the server to display, in connection with a network topology, aggregated network monitoring data associated with the device and the peer devices in the network.

2. The method of claim 1, wherein when the condition corresponding to the monitored network metric being met is associated with the device, the action comprises at least one of:
the device performing a first action directly; and
the device informing a peer device to perform a second action.

3. The method of claim 1, wherein when the condition corresponding to the monitored network metric being met is associated with a peer device, the action comprises at least one of:
the device performing a third action directly; and
the device informing the peer device or another peer device to perform a fourth action.

4. The method of claim 1, wherein the condition corresponding to the monitored network metric being met is based on at least one of:
a system-configured condition for a system-configured action or a user-defined action; and
a user-defined condition for a system-configured action or a user-defined action.

5. The method of claim 1, further comprising:
deploying the network-monitoring agent on a plurality of devices in the same local network, wherein the plurality of devices include the peer devices;
monitoring, by a respective device, network metrics based on a configuration file for the respective device; and
transmitting, by the respective device, the monitored network metrics to the server or to the server via one or more peer devices of the respective device.

6. The method of claim 1,
wherein the device, the peer devices, and other devices in the same local network comprise at least one of: an endpoint device; an intermediate device; an edge or leaf node; an internal or branch node; an access point; a switch; an access switch; a gateway; and a router.

7. The method of claim 1, further comprising discovering the peer devices of the device based on a protocol comprising at least one of:
a multicast domain name system (mDNS) protocol;
a Zigbee protocol;
a Bluetooth Mesh protocol; and
a broadcast Ethernet protocol.

8. The method of claim 1, further comprising:
displaying, on a screen of a device associated with the server, the aggregated network monitoring data associated with the device, the peer devices in the network, and other devices in the network,
wherein the aggregated network monitoring data is displayed in connection with the network topology, and
wherein the displayed aggregated network monitoring data indicates at least one of:
a visual representation of the network topology;
a physical location of a device or a group of devices in the network;
a number associated with the device or group of devices; and
a link or connection between two devices in the network.

9. The method of claim 8, wherein the display further includes interactive user elements which allow a user of the device associated with the server to view one or more of:
a statistic or status associated with the link or connection;
a rate of receiving or transmitting data;
a rate of dropped packets;
whether an external service is available;
whether an unexpected captive portal or proxy exists;
whether a power outage is detected; and
whether a response is received from a Dynamic Host Configuration Protocol (DHCP) server.

10. The method of claim 1, further comprising:
transmitting the data associated with the monitored metrics and the action to an external monitoring entity via the server.

11. The method of claim 1, further comprising:
storing, in a local cache of the device, information associated with the discovered plurality of peer devices.

12. The method of claim 1, further comprising determining the first peer device and the second peer device based on at least one of:
a ranked order for the discovered plurality of peer devices; and
a current network metric associated with one or more of the discovered plurality of peer devices.

13. A non-transitory computer-readable storage medium comprising instructions executable computer to:
deploy a network-monitoring agent on a device in a network;
discover, by the device, a plurality of peer devices on a same local network absent of receiving a cloud-orchestrated instruction;
responsive to successful direct communication with a server, obtain a network-monitoring configuration file for the device from the server, wherein the configuration file indicates network metrics to be monitored and a condition associated with a network metric;
responsive to unsuccessful direct communication with the server, obtain the configuration file from the server via a first peer device;
monitor the network metrics indicated in the configuration file;

responsive to the condition corresponding to a monitored network metric being met, perform a predetermined action;

responsive to successful direct communication with the server, transmit to the server data associated with the monitored metrics and the action; and responsive to unsuccessful direct communication with the server, transmit the data to the server via a second peer device, the transmitted data allowing the server to display, in connection with a network topology, aggregated network monitoring data associated with the device and the peer devices in the network.

14. The non-transitory computer-readable storage medium of claim 13, wherein when the condition corresponding to the monitored network metric being met is associated with the device, the action comprises at least one of:
the device performing a first action directly; and
the device informing a peer device to perform a second action; and wherein when the condition corresponding to the monitored network metric being met is associated with a peer device, the action comprises at least one of:
the device performing a third action directly; and
the device informing the peer device or another peer device to perform a fourth action.

15. The non-transitory computer-readable storage medium of claim 14, wherein the condition corresponding to the monitored network metric being met is based on at least one of:

a system-configured condition for a system-configured action or a user-defined action; and a user-defined condition for a system-configured action or a user-defined action.

16. The non-transitory computer-readable storage medium of claim 14, wherein the instructions further comprise instructions to:

deploy the network-monitoring agent on a plurality of devices in the same local network, wherein the plurality of devices include the peer devices;

monitor, by a respective device, network metrics based on a configuration file for the respective device; and transmit, by the respective device, the monitored network metrics to the server or to the server via one or more peer devices of the respective device.

17. The non-transitory computer-readable storage medium of claim 14, wherein the instructions further comprise instructions to:

display, on a screen of a device associated with the server, the aggregated network monitoring data associated with the device, the peer devices in the network, and other devices in the network, wherein the aggregated network monitoring data is displayed in connection with the network topology, wherein the displayed aggregated network monitoring data indicates at least one of:
a visual representation of the network topology;
a physical location of a device or a group of devices in the network;
a number associated with the device or group of devices; and
a link or connection between two devices in the network.

18. The non-transitory computer-readable storage medium of claim 17, wherein the display further includes interactive user elements which allow a user of the device associated with the server to view one or more of:

a statistic or status associated with the link or connection;
a rate of receiving or transmitting data;
a rate of dropped packets;
whether an external service is available;
whether an unexpected captive portal or proxy exists;
whether a power outage is detected; and
whether a response is received from a Dynamic Host Configuration Protocol (DHCP) server.

* * * * *